Figure 1:
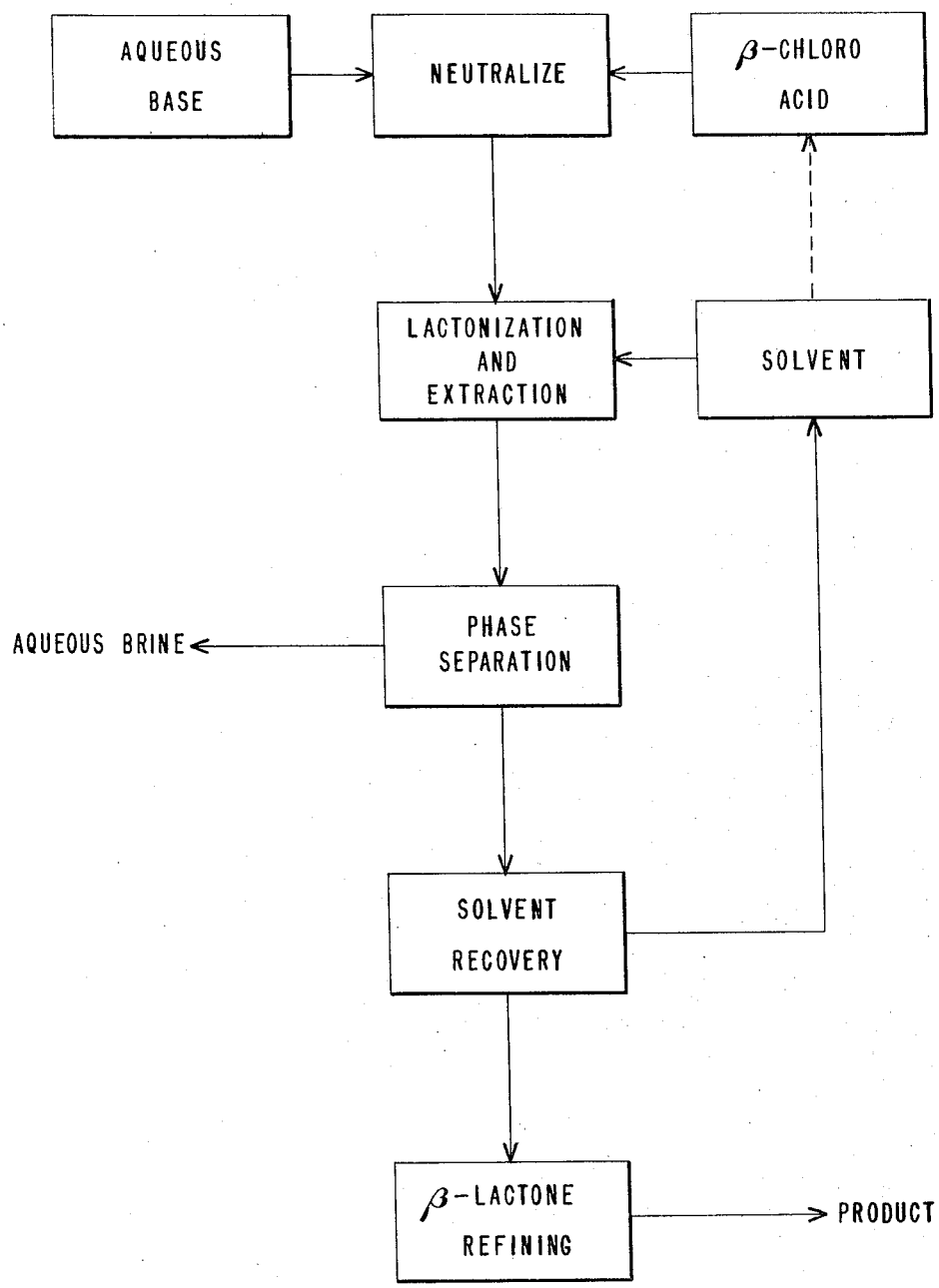

Dec. 13, 1966  C. E. LORENZ  3,291,810
PROCESS FOR THE PREPARATION OF β-LACTONES
Filed Dec. 9, 1964  2 Sheets-Sheet 1

INVENTOR
C. EDWARD LORENZ

BY
ATTORNEY

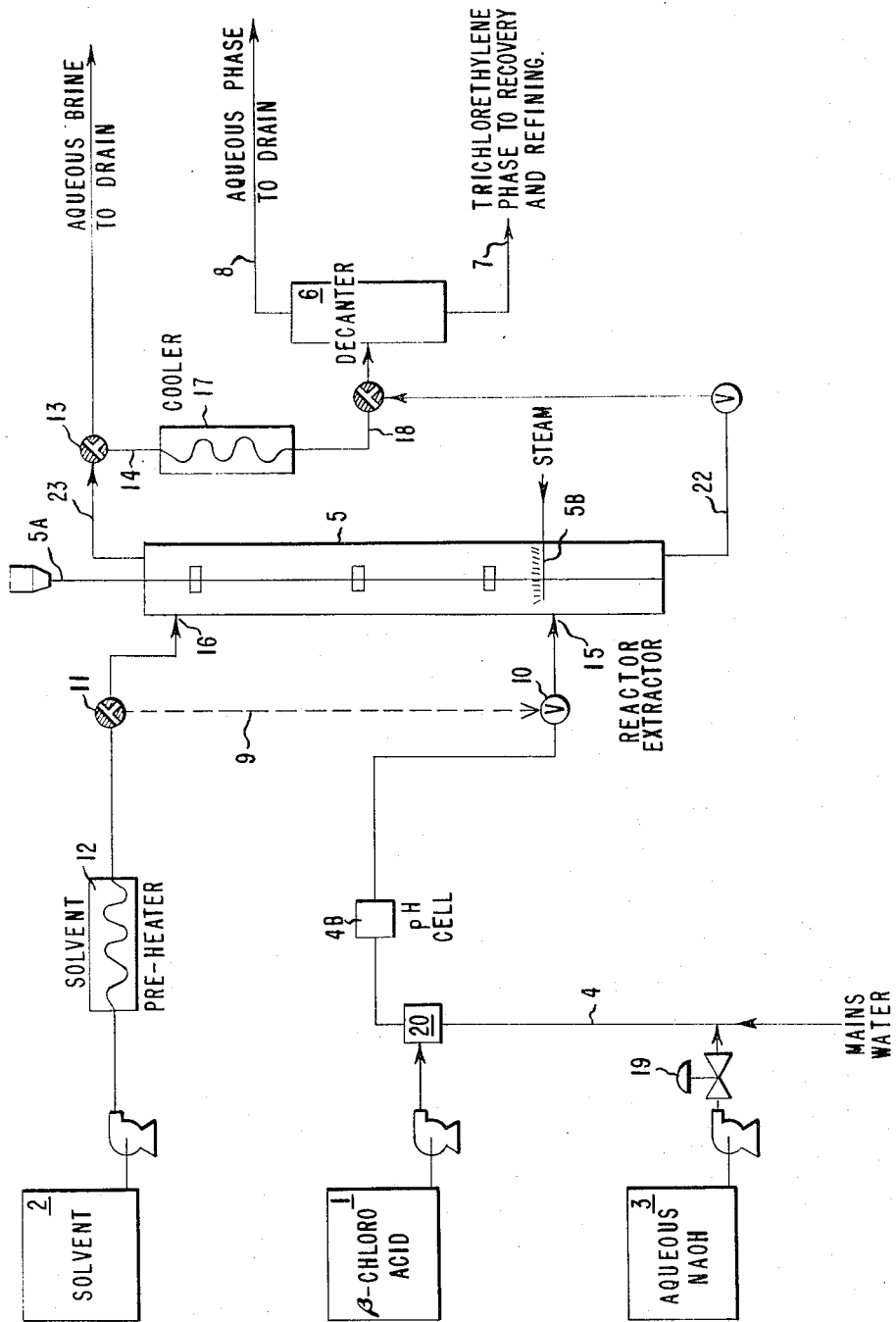

3,291,810
PROCESS FOR THE PREPARATION OF
β-LACTONES
Carl Edward Lorenz, Wilmington, Del., assignor to E. I.
du Pont de Nemours and Company, Wilmington, Del.,
a corporation of Delaware
Filed Dec. 9, 1964, Ser. No. 417,011
16 Claims. (Cl. 260—343.9)

This invention is concerned with an improved process for the preparation of pivalolactone.

The preparation of β-lactones by ring closure of β-halocarboxylic acids in the presence of aqueous bases has been reviewed by Harold E. Zaugg in chapter 7 of volume VIII, Organic Reactions, John Wiley & Sons, Inc., New York, 1954. The art discussed there illustrates the problems involved in developing a rapid, economical process for achieving high yields of α,α-disubstituted-β-propiolactones due to the high reactivity of these β-lactones and the side reactions involved. These side reactions include decarboxylation to olefinic compounds, hydrolysis to β-hydroxyacids, and polymerization.

The chemical reactions involved in this process are shown by the following equations:

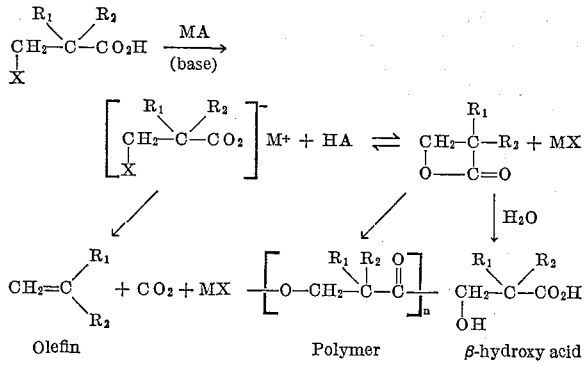

X represents Cl or Br, $R_1$ and $R_2$ represent aliphatic substituents, MA represents the base employed, M the cation and A the anion of the base.

It should be noted that the conversion of the anion of the β-chloropropionic acid to the β-lactone is a reversible reaction while the side reactions leading to olefinic compounds, hydroxyacids, and polymers are irreversible. As pointed out by Dr. Zaugg, supra, the rates of all the reactions leading to by-products increase rapidly with increasing temperature.

Thus, the teachings of this prior art are that, in order to achieve the β-lactone as principal product, the reaction temperature must be kept low, preferably between 0° C. and room temperature, but in any case never over 50° C. In the case of the synthesis of β-lactones, such as, e.g. pivalolactone, with two aliphatic groups substituted on the α-position, the β-bromoacids have been used because the reaction rates of the β-chloroacids were considered too slow while the β-iodo acids tended to give excessive olefinic by-product. Thus, the synthesis of pivalolactone α,α-dimethyl-β-propiolactone) was described in a graduate dissertation by S. M. Hagman, Dissertation, Lund, 1924 [C.A. 18, 2497 (1924)], using the β-bromoacid and either aqueous NaOH or aqueous Ba(OH)₂ at 0.2° C.

The preparation of a variety of β-lactones from the corresponding β-bromocarboxylic acids is disclosed in French Patent 1,231,163, published September 27, 1960. In one case, Example 9, the preparation of α-ethyl-α-butyl-β-propiolactone from the corresponding β-chloroacid was attempted for comparison with the preparation from the β-bromoacid. While the reaction half time at 25° C. for the β-bromoacid was 2 minutes and 50 seconds, it was 66 minutes for the β-chloroacid, making this appear to be an unattractive process for a commercial plant.

The process followed in the above art was to neutralize the β-halopropionic acid with a stoichiometric quantity of a base, keeping the temperature in the range of 0° to 30° C. and then to extract β-lactone with a water-immiscible solvent, usually methylene chloride, ether, or chloroform, keeping both the aqueous salt solution and the organic solvent used for extraction cool.

It has now been discovered that α,α-dimethyl-β-chloropropionic acid can be converted rapidly, in yields of 65% to 95%, to pivalolactone, the β-lactone having the structure

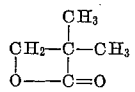

by preparation of an aqueous solution containing the anions of the β-chloropropionic acid by neutralization of the acid with a dilute aqueous base to a pH in the range of 5.0 to 11.4, preferably 6.5 to 9.0 prior to injection into the reactor. The neutralization is done at temperatures in the range of 0° to 65° C., depending upon hold-up time prior to injection into reactor. The β-lactone is formed and extracted from the aqueous phase as rapidly as formed by immediately injecting the resulting cool salt solution comprising the anions into a highly agitated dispersion of aqueous phase and inert organic solvent maintained at a temperature in the range of 60° C. to 120° C., preferably to 100° C., under a pressure sufficient to prevent boiling of the solvent, and the resulting solution of β-lactone in the inert, organic solvent is separated from the aqueous phase after an average contact time, for the aqueous phase, of about 1 to 30 minutes, preferably 2–5 minutes. The product, pivalolactone, can be recovered from the inert, organic solvent by conventional refining techniques. Preferably this should be done under conditions which minimize loss of the β-lactone (e.g. short contact time and/or reduced pressure and temperature).

The process of this invention is based upon the discovery that the rate of lactone formation from the anions of α,α-dimethyl-β-chloropropionic acid increases with temperature at a more rapid rate than do the reaction rates of the side reactions discussed above. Because of this discovery it has been found that higher yields of the lactone can be achieved at temperatures above 60° C. when the aqueous phase is kept in well-dispersed admixture with an excess of an inert organic solvent so that the β-lactone is extracted from the aqueous phase as rapidly as formed. In view of the extent of the solubility of pivalolactone in hot water, this immediate extraction is critical to the success of the process. This discovery was quite unexpected in view of the teachings of the prior art discussed above.

If desired, the β-chloroacid can be replaced by the corresponding acid halide or acid anhydride as the starting material since these likewise will, upon reaction with a base, yield the intermediate anion, necessary for ring closure. Of course in such case, a larger proportion of base is required.

Any base which is strong enough, in aqueous solution, to react with the α,α-dimethyl-β-chloropropionic acid to form its anions in aqueous solution is suitable for use in the process of this invention. These include the alkali metal hydroxides, carbonates, and bicarbonates such as NaOH, KOH, LiOH, $Na_2CO_3$, $K_2CO_3$, $NaHCO_3$, $KHCO_3$, etc. Also suitable are the alkaline earth hydroxides such as $Ca(OH)_2$ and $Ba(OH)_2$. Many other common bases are also suitable such as the alkali metal salts of acids weaker than the α,α-dimethyl-β-chloropropionic acid, ammonium hydroxide, quaternary ammonium hydroxides such as tetramethylammonium hydroxide, and water-soluble aliphatic amines such as trimethylamine, ethylamine, methylamine, isopropylamine, dimethylamine, and butylamine.

In order to minimize side reactions and control the temperature rise from heat of neutralization, the base should be employed as an aqueous solution, usually 2% to 15% by weight base, conveniently about 10% by weight. The neutralization should be carried out at as low a temperature as practical in order to prevent loss to the undesired byproducts discussed above; temperatures in the range of about 0° to 65° C. are suitable. For the continuous process, 30°–65° C. is preferred. The higher the temperature of neutralization within the range indicated, the more quickly the resultant salt solution must be injected into the agitated, high temperature reactor since any β-lactone formed in the neutralization step may be lost by hydrolysis to the β-hydroxyacid or by decarboxylation or polymerization before it can be extracted out of aqueous solution while dispersed in the two-phase, agitated reactor-extractor.

Since the α,α-dimethyl-β-chloropropionic acid employed in the process of this invention is solid at some of the neutralization temperatures employed in the process of this invention, it is sometimes convenient to prepare a concentrated solution of the α,α-dimethyl-β-chloropropionic acid in the water-imiscible solvent which will be employed in the reactor-extractor to extract the β-lactone, and to mix this concentrated solution with the aqueous base in the neutraliziation step. Alternatively, molten acid can be injected into the aqueous base.

The water-immiscible organic solvent employed may be of a variety of liquid, polar organic compounds which are chemically inert under the reaction conditions. Suitable classes include halogenated hydrocarbons (such as trichloroethylene, ethylene dichoride, chloroform and methylene chloride), aromatic ketones (such as acetophenone), aromatic hydrocarbons (such as benzene or toluene) and nitroaromatics (such as nitrobenzene). Criteria for suitable solvents, in addition to chemical inertness under the conditions of the reaction, include a highly favorable distribution coefficient ($\geq 10$ at 25° C.) for the β-lactone with respect to aqueous salt solutions having an ionic strength of at least 1, substantial insolubility of the solvent in water and of water in the solvent, ease of separation from the aqueous phase, ease of separation from the β-lactone by distillation, and commercial availability at low cost. There is also an advantage in employing solvents which have relatively high boiling points, i.e., boiling points substantially above the reaction temperatures (60°–120° C.), since the use of the lower boiling solvents requires that the reactor-extractor be constructed for operation under higher pressures in order to maintain the solvent in the liquid phase. In any case, the reactor-extractor must be operated under sufficient pressure to prevent boiling or appreciable vaporization of the solvent.

Preferred solvents meeting the foregoing criteria are nitrobenzene, benzene and the higher-boiling, halogenated hydrocarbons such as trichloroethylene, and ethylene dichloride.

In carrying out the process of this invention in a continuous manner, the volume ratio of organic solvent to aqueous phase in the reactor-extractor should be at least 1:1 and preferably the ratio should be larger, in the range of 2:1 to 4:1, in order to obtain extraction of the pivalolactone from the aqueous phase as rapidly as it is formed. Even higher yields can be obtained at ratios of 10:1 although this requires separation and recirculation of very large volumes of solvent. Sufficient organic solvent should be employed so that the concentration of pivalolactone extracted into the solvent remains low, not above 10% by volume and preferably 3–6%.

This reaction can be carried out in a batch-wise manner by adding the cool, neutralized α,α-dimethyl-β-chloropropionic salt solution to a baffled, stirred pot, preheated to reaction temperature, stirring vigorously for the desired reaction time to maintain a dispersion of one phase in the other, and stopping the agitation and drawing off the organic phase containing the pivalolactone. Another way of carrying out the batch reaction is to mix α,α-dimethyl-β-chloropropionic acid, the water, and the solvent, heat to reaction temperatures, and then inject the base while stirring vigorously for the desired reaction time and then separating the organic phase containing the pivalolactone, as described above. However, it is usually preferable to conduct the reaction in a continuous manner in a stirred column such as a continuous mixer-extractor or a rotating disc contactor. These columns may be operated either with countercurrent or co-current flow of the aqueous and organic solvent phases.

FIGURE I is a diagrammatic flow-sheet of the process of this invention showing the sequence of the principal elements involved in the process.

FIGURE II illustrates the principal features of a continuous process for the manufacture of pivalolactone from chloropivalic acid. This process employs a reactor-extractor 5 which is heated by steam-jets 5B and vigorously stirred by the multi-blade stirrer 5A. The reactor-extractor can be operated either in a counter-current or a co-current fashion. The reactor-extractor may be divided into stages by baffles between each of the stirrer blades. FIGURE II is more fully described hereinafter in Examples 3 and 5, which describe continuous processes for the manufacture of pivalolactone.

The following examples are provided to illustrate the process of this invention without any intention to limit the invention to the specific embodiments therein shown since obvious modifications would be apparent to one of skill in the art.

EXAMPLE 1

This is an example of a batch process carried out in a 500 ml., creased, round-bottomed flask fitted with a stirrer, thermometer, condenser, and addition funnel. A drain-off tube was fitted to the bottom of the flask to withdraw portions of the contents as required for analysis. Electrical heating was applied to the exterior of the entire flask by a rheostatically-controlled resistance wire.

Equal volumes of water and trichloroethylene (50 ml. of each) were charged to the reactor and preheated with stirring to 65° to 70° C. Chloropivalic acid (α,α-dimethyl-β-chloropropionic acid) (0.29 mole) and aqueous NaOH (0.26 mole) were rapidly mixed with an additional 50 ml. of water for about 1 minute at a temperature of 30°±5° C. and then added rapidly to the stirred reactor through the addition funnel. Thereafter, at time intervals as shown in Table I, the stirring was temporarily discontinued, the two phases in the reactor allowed to separate, and the trichloroethylene solution removed through the tube at the bottom of the flask and replaced with fresh, preheated aliquots. As shown in Table I, the trichloroethylene solution of product was removed at intervals of 2, 5, 8, 14, 20, and 26 minutes, and the yield of β-lactone calculated for each aliquot. Each added portion of trichloroethylene was 50 ml., as was the initial portion. The total yield of β-lactone obtained in this fashion was 89.3% after a total of 26 minutes.

Table I

CONVERSION OF AQUEOUS SODIUM CHLOROPIVALATE TO PIVALOLACTONE AT 65°–70° C. IN PRESENCE OF TRICHLOROETHYLENE

| Σ Time (min.) | Concentration β-lactone in solvent (Wt. Percent) | Wt. Lactone Formed (g.) | Yield Percent | Σ Percent Yield |
|---|---|---|---|---|
| 2 | 6.35 | 9.315 | 35.7 | 35.7 |
| 5 | 6.89 | 5.174 | 19.8 | 55.5 |
| 8 | 4.83 | 3.618 | 13.9 | 69.4 |
| 14 | 4.40 | 3.300 | 12.6 | 82.0 |
| 20 | 1.92 | 1.407 | 5.4 | 87.4 |
| 26 | 0.73 | 0.509 | 1.9 | 89.3 |

EXAMPLE 2

This is another example of a batch process, but nitrobenzene, rather than trichloroethylene of Example 1, was employed as the extraction solvent. The apparatus was the same as that described for Example 1. The reaction flask was charged with 200 ml. of nitrobenzene and 150 ml. of water, preheated to 85° C., and vigorously stirred to produce a dispersion. A solution of 0.200 mole of chloropivalic acid and 0.195 mole of sodium hydroxide in 50 ml. of water was prepared at room temperature and then added all at once through the addition funnel to the hot, stirred reaction vessel. After 2 minutes at 80° C. to 84° C., agitation was halted, and the nitrobenzene layer, which was separated on the bottom, was drained through the draw-off tube. This is solution A. Immediately an additional 200 ml. of preheated nitrobenzene was added through the addition funnel and agitation resumed for an additional 2 minutes. Again agitation was stopped and the nitrobenzene layer was drawn off through the discharge tube. This is solution B. The two nitrobenzene solutions were analyzed for pivalolactone content by gas chromatography, and the yields were calculated based upon the sodium chloropivalate charged. Solution A contained 14.3 grams of pivalolactone (77.3% yield) and solution B contained 1.6 grams of pivalolactone (8.7% yield) for a total yield of 81.5%.

EXAMPLE 3

This example illustrates the process of this invention when carried out in a continuous fashion in accord with FIGURE II with the reactor-extractor 5 operated with a counter-current flow. Molten chloropivalic acid was stored in and provided from heated tank 1. Approximately 50 percent by weight aqueous NaOH solution was stored in tank 3. The solvent, trichloroethylene, was stored in tank 2.

The 50 percent NaOH solution was diluted continuously by pumping it into the reactor feed pipe 4 through which a stream of mains water was passing to the reactor. Thus a dilute solution containing 1–10 percent by weight NaOH was produced. Into this dilute NaOH stream was pumped the molten chloropivalic acid at 55° C. through a mixing orifice 20 to prepare a solution containing 5–25 percent by weight sodium chloropivalate. This solution at 40–65° C. passed through pH cell 4B directly to the bottom of the reactor-extractor 5 at point 15. pH in the feed pipe was maintained between 6.8 and 11.0 by control of the flow of aqueous NaOH through valve 19. Residence time of the feed solution in the feed-pipe was 15–40 seconds. (Feed system designed to minimize ring closure reaction therein.) The solvent, trichloroethylene, was pumped from tank 2 through preheater 12 where it was heated to 35–95° C., and thence to the top 16 of the reactor-extractor 5 at the rate of 5–15 parts by volume per minute, the aqueous feed rate being 5–10 parts by volume per minute.

In the reactor-extractor the lighter aqueous phase flows upwards past the downflowing solvent phase. Efficient phase contact is maintained by high speed agitation by multi-blade stirrer 5A. The speed of the stirrer was adjusted so as to maximize the yield obtained to pivalolactone by producing a high degree of dispersion and hence intimate contact of the two phases; in this system, optimum speed corresponded to 380–490 r.p.m. The reactor-extractor was maintained at an operating temperature of 85°–95° C. by passing live steam into the base of the column through nozzles 5B. Residence time of aqueous phase in the reaction zone was 4–8 minutes. The reactor-extractor was maintained at a pressure of 25 p.s.i.g. to prevent the solvent and water from vaporizing.

The trichloroethylene solution withdrawn at the bottom of 5 through line 22 was shown by gas chromatographic analysis to contain 4–10 percent by weight pivalolactone at steady state. This represents a 75–85 precent yield based upon the sodium chloropivalate fed.

The aqueous brine was withdrawn from the top of column 5 and passed via line 23 to drain.

The trichloroethylene solution of pivalolactone withdrawn from the reactor through line 22 was passed to decanter 6 where it was separated from any entrained aqueous phase and then passed by line 7 to a recovery train where the solvent was flashed and distilled away to concentrate the pivalolactone. Recovered solvent was recycled to storage tank 2 while the pivalolactone was refined by distillation under reduced pressure. The entrapped aqueous phase from decanter 6 was passed to drain via line 8.

The overall, in-hand yield of refined pivalolactone achieved by this example, based on chloropivalic acid fed, averaged about 75 percent.

The process of this example was operated over the range of conditions shown in Table II. From this varied operation a set of preferred conditions, as also shown in Table II, was determined.

Table II

CONDITIONS OF OPERATION IN EXISTING SEMI-WORKS UNIT (IN ORDER APPEARING IN TEXT OF EXAMPLE 3 ABOVE)

| Wide Range | | Preferred Condition |
|---|---|---|
| 1–30 wt. percent | Dilute NaOH Conc'n | 7 wt. percent. |
| 5–30 wt. percent | β-chloroacid solution conc'n | 30 wt. percent. |
| | β-chloroacid solution temp | 40° C. |
| 6.5–11.0 | Feed system pH | 7.0. |
| 10–60 seconds | Feed system residence time | 15 seconds. |
| 60–100° C. | Triclene temperature | 90° C. |
| 5–30 vols./min. | Triclene flow rate | 10 vols./min. |
| 5 vols./min. | Aqueous flow rate | 5 vols./min. |
| 0–450 | Agitator, r.p.m. | 400 r.p.m. |
| 60–100° C. | Reactor temp | 90° C. |
| 0–10 minutes | Aqueous phase residence time | 7 minutes. |
| 0–10% by wt. | Product concentration | 5% by wt. |
| Up to 85% | Yield | 80%. |
| Up to 80% | Overall yield | 75%. |

EXAMPLE 4

This example is similar to that of Example 3 except that nitrobenzene was used as the solvent instead of trichloroethylene. A 1.6 N aqueous solution of sodium chloropivalate prepared and maintained at 0–5° C. was pumped at the rate of 4.9 ml. per minute into the bottom of a small (1″ diameter by 6 ft.) 12-stage Scheibel extractor filled with nitrobenzene and maintained at 90± 2° C. Nitrobenzene was continuously added at the top of the column and removed at the bottom as a solution of the product pivalolactone at the rate of 10 ml. per minute. After steady-state equilibrium was reached, gas chromatographic analysis of the effluent nitrobenzene indicated 6.5 volume percent pivalolactone. This represented an 82% yield based upon the chloropivalate feed rate.

EXAMPLE 5

In this example the process is similar to that of Example 3 except that the reactor-extractor 5 of FIGURE II is arranged for co-current flow. The preheated trichloroethylene was passed by turning valve 11 through line 9 (dotted in FIGURE II) to mixing T 10, instead of into the top of column 5. Sodium chloropivalate solution at a pH of 6 to 6.5 was mixed with the additional trichloroethylene at T 10 entering the reactor, which was maintained by steam heating at 65° to 75° C., at 15. The mixture of aqueous and trichloroethylene phases leaving the top of column 5 was taken overhead together through line 23 and passed by valve 13 to line 14 via cooler 17 and line 18 to the decanter 6. From the decanter the trichloroethylene solution, containing 6–8% by weight, of pivalolactone, was passed via line 7 to the same refining system as described for Example 3. When operated in this fashion the yield of pivalolactone was about 65%.

The process of this invention provides an improved method for obtaining pivalolactone which is particularly useful for conversion to polyesters by polymerization processes known to the art.

I claim:

1. A process for the preparation of pivalolactone which comprises neutralizing, at a temperature in the range of 0°–65° C., α,α-dimethyl-β-chloropropionic acid with a dilute aqueous solution of a base to provide the anion of said α,α-dimethyl-β-chloropropionic acid as an aqueous solution of the salt of the α,α-dimethyl-β-chloropropionic acid having a pH in the range of 5.0 to 11.4, and forming pivalolactone and extracting it from the aqueous phase as rapidly as formed in yields of at least 65%, based on said α,α-dimethyl-β-chloropropionic acid, by immediately intimately admixing and dispersing by vigorous agitation said aqueous solution with a water-immiscible organic solvent for the pivalolactone at a temperature in the range of 60°–120° C. for from 1 to 30 minutes, under a pressure sufficient to maintain the water and the organic solvent in the liquid phase, while vigorously agitating the mixture, and separating the resulting solution of said pivalolactone in the water-immiscible solvent from the aqueous phase.

2. The process of claim 1 wherein the base is NaOH.

3. The process of claim 1 wherein the organic solvent is trichloroethylene.

4. The process of claim 1 wherein the organic solvent is nitrobenzene.

5. The process of claim 1 wherein the organic solvent is ethylene dichloride.

6. The process of claim 1 in which the α,α-dimethyl-β-chloropropionic acid is employed as a concentrated solution in the water-immiscible, organic solvent.

7. The process of claim 1 in which the α,α-dimethyl-β-chloropropionic acid is neutralized by injecting it as a molten stream into the dilute aqueous solution of base.

8. A continuous process for the preparation of pivalolactone which comprises neutralizing, at a temperature in the range of 30°–65° C., a concentrated solution of α,α-dimethyl-β-chloropropionic acid in a water-immiscible organic solvent with a dilute aqueous solution of a base, selected from the group consisting of the alkali metal bases and the alkaline earth metal bases, to provide α,α-dimethyl-β-chloropropionate ions as an aqueous solution of the metal salt of α,α-dimethyl-β-chloropropionic acid having a pH in the range of 5.0–11.4, and forming the lactone ring and extracting the pivalolactone from the aqueous phase as rapidly as formed in yields of at least 65%, based on the α,α-dimethyl-β-chloropropionic acid, by passing said aqueous solution continuously into and through a vigorously agitated reaction-extraction zone, maintained at 60°–120° C., under a pressure sufficient to maintain the water and the organic solvent in the liquid phase, in which zone said aqueous solution is dispersed into intimate contact with from 1 to 10 parts by volume of said water-immiscible, organic solvent and, after a residence time in said zone of from 2 to 6 minutes, separating the resulting solution of pivalolactone in said organic solvent from the aforesaid aqueous phase.

9. The process of claim 8 in which the base is NaOH.

10. The process of claim 8 in which the water-immiscible organic solvent is trichloroethylene.

11. The process of claim 8 in which the water-immiscible organic solvent is ethylene dichloride.

12. The process of claim 8 in which the water-immiscible organic solvent is nitrobenzene.

13. The process of claim 8 in which the aqueous solution of the metal salt of α,α-dimethyl-β-chloropropionic acid is passed through the vigorously-agitated reaction-extraction zone in counter-current flow to the water-immiscible organic solvent.

14. The process of claim 8 in which the aqueous solution of the metal salt of α,α-dimethyl-β-chloropropionic acid is passed through the vigorously-agitated reaction-extraction zone in co-current flow with the water-immiscible organic solvent.

15. A continuous process for the preparation of pivalolactone which comprises neutralizing molten α,α-dimethyl-β-chloropropionic acid at a temperature in the range of 30°–65° C. with a dilute aqueous solution of NaOH to provide α,α-dimethyl-β-chloropropionate ions as an aqueous solution of sodium α,α-dimethyl-β-chloropropionate having a pH in the range of 6.5–9.0, and forming the lactone ring and extracting the pivalolactone from the aqueous phase as rapidly as formed in yields of at least 75%, based on the α,α-dimethyl-β-chloropropionic acid, by passing said aqueous solution within 15–40 seconds into and continuously upwardly through a vigorously agitated reaction-extraction zone, maintained at about 85°–95° C., in which zone said aqueous solution is dispersed into intimate contact with a downwardly flowing stream of from 2 to 4 parts by volume of trichloroethylene, said reaction-extraction zone being maintained at a pressure sufficient to maintain the trichloroethylene in the liquid phase, and, after a residence time of the aqueous phase in said zone of from 2 to 6 minutes, withdrawing the resulting solution of pivalolactone in trichloroethylene from the bottom of the reaction-extraction zone and separating pivalolactone by fractional distillation from the trichloroethylene solvent, and recycling said trichloroethylene.

16. The process of claim 15 in which the concentration of sodium α,α-dimethyl-β-chloropropionate in the aqueous solution passed to the reaction-extraction zone is about 8–12% by weight.

References Cited by the Examiner

UNITED STATES PATENTS 2,977,373    3/1961    Reynolds et al. _____ 260—343.9

OTHER REFERENCES

Adams et al. (Editors): Organic Reactions, John Wiley and Sons, Inc., New York (1954), pp. 308–312.

JOHN D. RANDOLPH, *Primary Examiner.*

WALTER A. MODANCE, *Examiner.*

JAMES A. PATTEN, *Assistant Examiner.*